United States Patent [19]
Frost et al.

[11] Patent Number: 5,548,678
[45] Date of Patent: Aug. 20, 1996

[54] OPTICAL FIBRE MANAGEMENT SYSTEM

[75] Inventors: Peter L. J. Frost; John Kerry, both of Suffolk, England

[73] Assignee: British Telecommunications public limited company, London, England

[21] Appl. No.: 202,190

[22] Filed: Feb. 24, 1994

[30] Foreign Application Priority Data

Sep. 10, 1993 [EP] European Pat. Off. ............. 93307145

[51] Int. Cl.⁶ .................................................. G02B 6/26
[52] U.S. Cl. ......................... 385/135; 385/134; 385/136; 385/137
[58] Field of Search .................................. 385/134, 135, 385/136, 137, 138, 139

[56] References Cited

U.S. PATENT DOCUMENTS

| | | | |
|---|---|---|---|
| 5,100,221 | 3/1992 | Carney et al. | 385/135 |
| 5,185,845 | 2/1993 | Jones | 385/135 |
| 5,247,603 | 9/1993 | Vidacovich et al. | 385/134 X |
| 5,278,933 | 1/1994 | Hunsinger et al. | 385/135 |
| 5,323,480 | 6/1994 | Mullaney et al. | 385/135 |

FOREIGN PATENT DOCUMENTS

| | | |
|---|---|---|
| 0159857 | 10/1985 | European Pat. Off. . |
| 0341027 | 11/1989 | European Pat. Off. . |
| 0370819 | 5/1990 | European Pat. Off. . |
| 0490644A1 | 6/1992 | European Pat. Off. . |
| 0538164A1 | 4/1993 | European Pat. Off. . |
| WO91/10927 | 7/1991 | WIPO . |

*Primary Examiner*—Rodney B. Bovernick
*Assistant Examiner*—Phan T. H. Palmer
*Attorney, Agent, or Firm*—Nixon & Vanderhye P.C.

[57] ABSTRACT

An optical fibre management system includes a plurality of splice trays arranged in a stack. Each splice tray has a main body portion for holding at least one splice, and for storing fibres leading to the splice(s), and a fibre entry/exit portion for feeding fibre to/from the main body portion. Each tray is mounted in the stack so as to be movable from a stacked position, in which it is aligned with the other trays, to first and second operating positions in which the fibre entry/exit portion and the main body portion respectively are accessible.

38 Claims, 8 Drawing Sheets

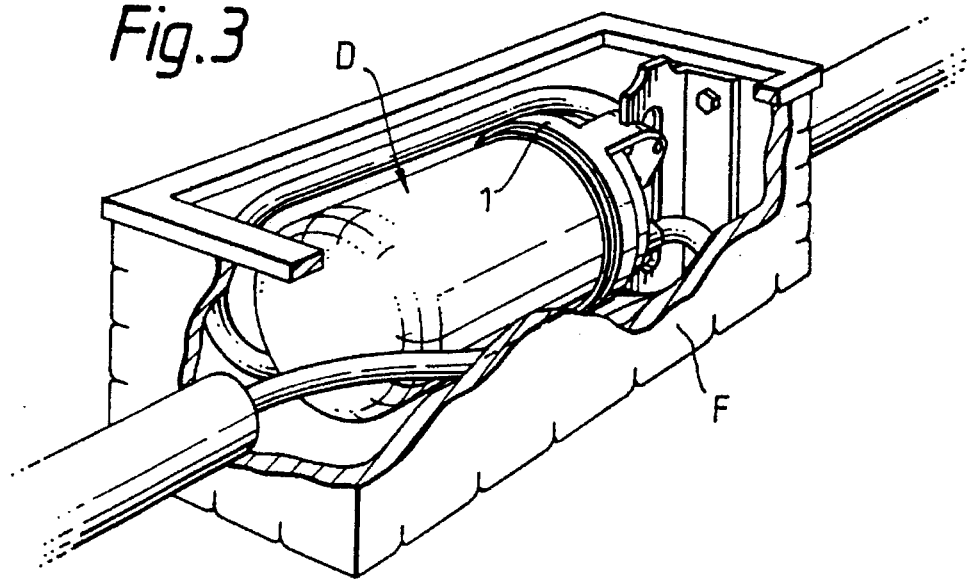
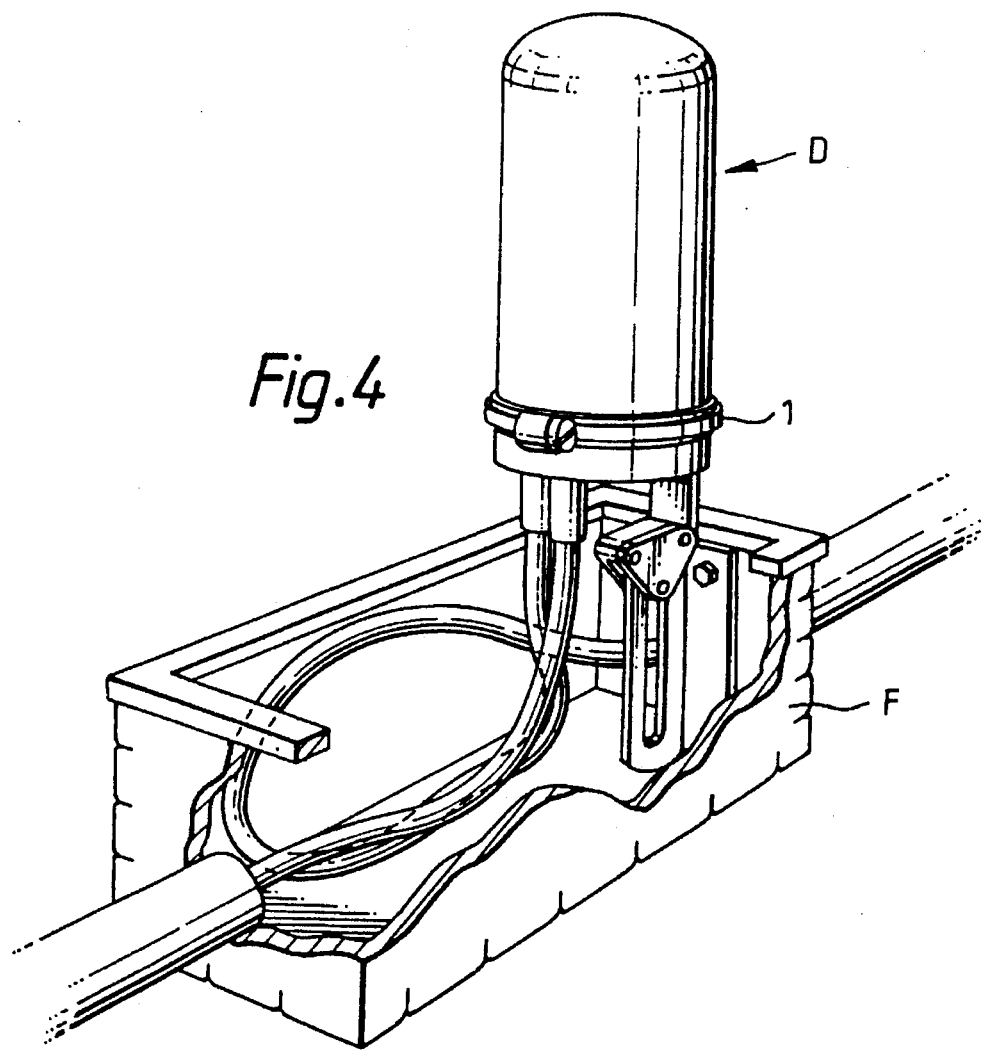

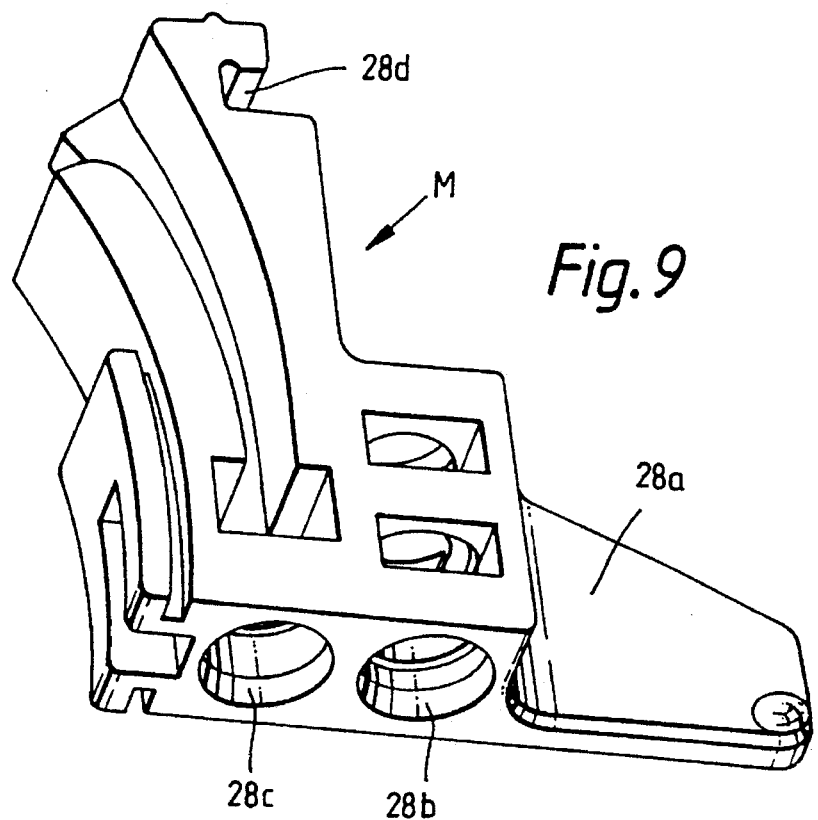
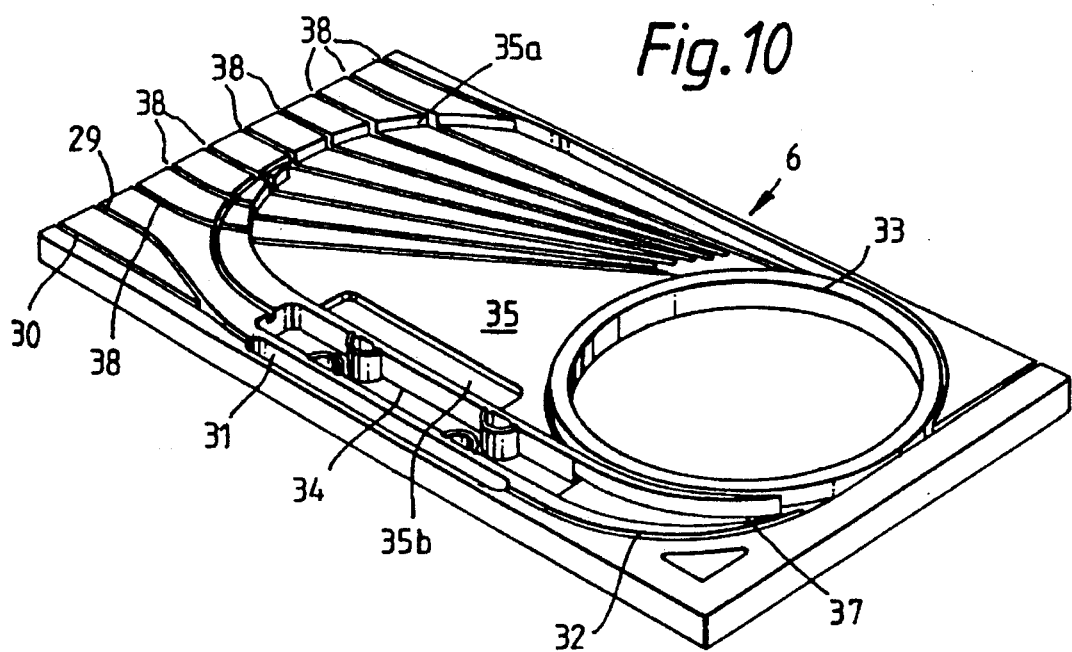

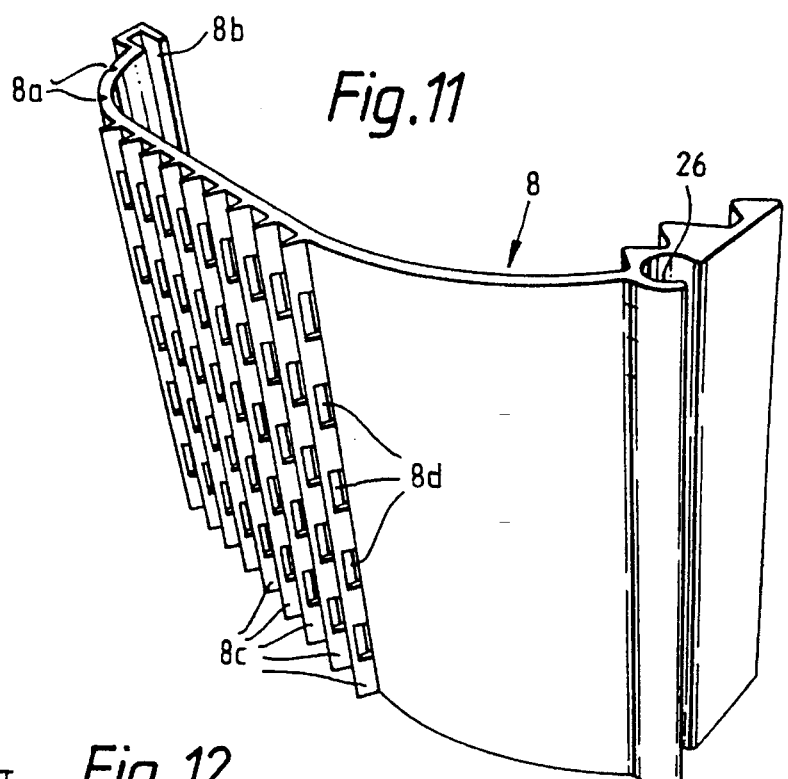
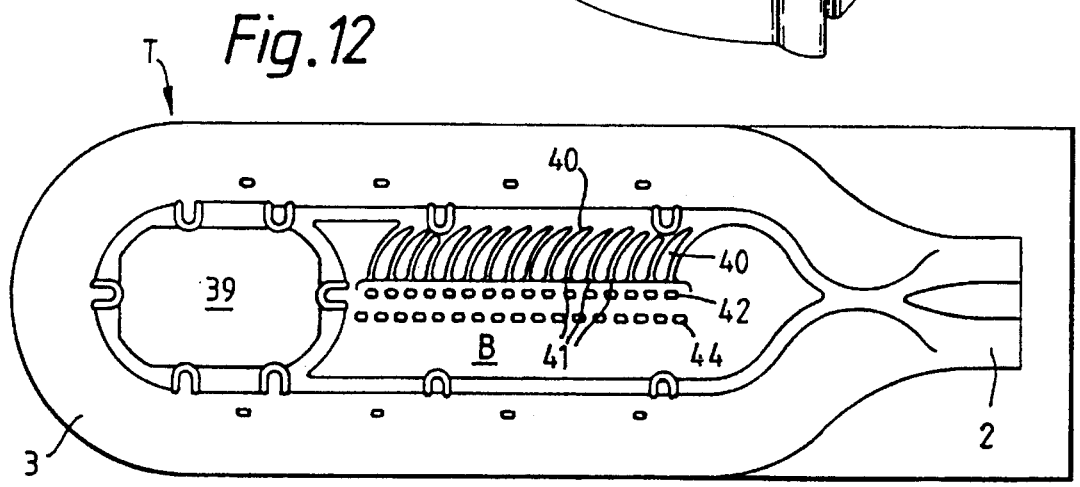
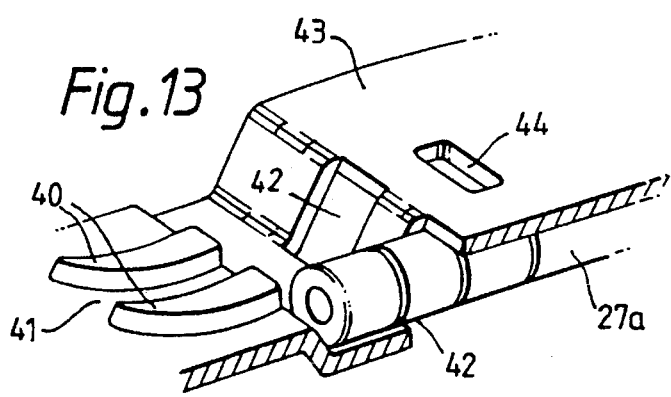

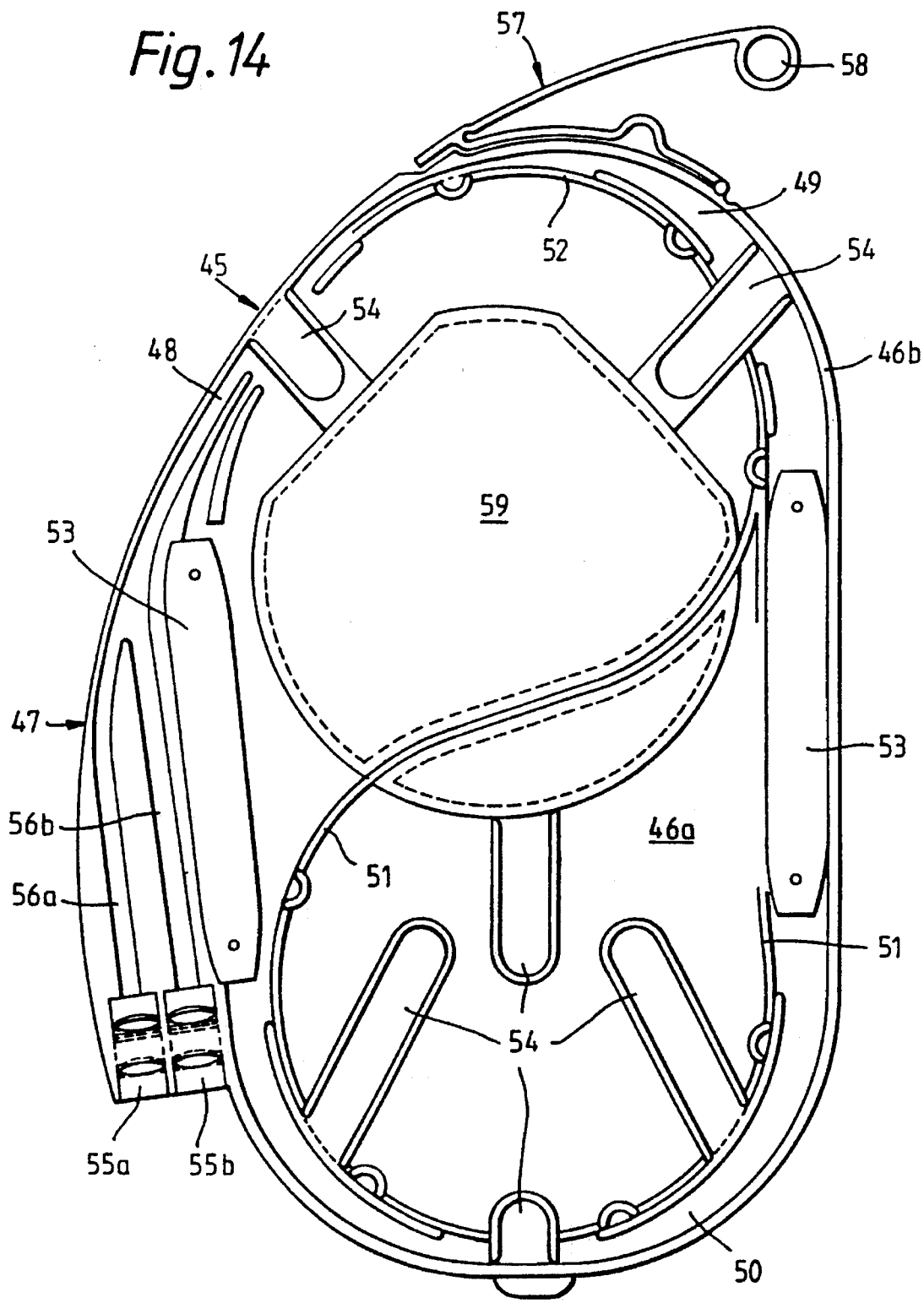

OPTICAL FIBRE MANAGEMENT SYSTEM

RELATED APPLICATIONS

This application is related as a parent to subsequent CIP application Ser. No. 08/278,217 filed Jul. 21, 1994 naming Messrs. Peacock, Frost and Kerry as inventors.

1. Field of the Invention

This invention relates to an optical fibre management system, and in particular to an optical fibre splitter array sub-assembly for incorporation in the node of an optical fibre telecommunications network.

2. Related Art

In the United Kingdom, the telecommunications network includes a trunk network which is substantially completely constituted by optical fibre, and a local access network which is substantially completely constituted by copper pairs. Flexibility in the copper access network is provided at two points en route to the customer; firstly, at street-side cabinets serving up to 600 lines; and secondly, at distribution points serving around 10–15 lines. In total, the network has about 250,000 km of underground ducts, 83,000 cabinets, 3.1 million distribution points and 3.7 million manholes and joint boxes. Eventually, it is expected that the entire network, including the access network, will be constituted by fibre.

The ultimate goal is a fixed, resilient, transparent telecommunications infrastructure for the optical access network, with capacity for all foreseeable service requirements. One way of achieving this would be to create a fully-managed fibre network in the form of a thin, widespread overlay for the whole access topography as this would exploit the existing valuable access network infrastructure. Such a network could be equipped as needs arise, and thereby could result in capital expenditure savings, since the major part of the investment will be the provision of terminal equipment on a just in time basic. It should also enable the rapid provision of extra lines to new or existing customers, and flexible provision or reconfiguration of telephony services.

In order to be completely future proof, the network should be single mode optical fibre, with no bandwidth limiting active electronics within the infrastructure. Consequently, only passive optical networks (PONs) which can offer this total transparency and complete freedom for upgrade, should be considered.

The most common passive optical network is the simplex single star, with point-to-point fibre for each transmit and receive path, from the exchange head end (HE) to the customer network terminating equipment (NTE). This network design has been used throughout the world and meets all the access criteria. It involves high fibre count cables, and unique electro-optic provision at HE and NTE for each customer. The resulting inherent cost can only be justified for large business users, who generally also require the security of diverse routing, which increases the cost still further.

The advent of optical splitters and wavelength-flattened devices has enabled the concept of the PON to be taken one step further. These passive components allow the power transmitted from a single transmitter to be distributed amongst several customers, thereby reducing and sharing the capital investment. In 1987, BT demonstrated splitter technology in a system for telephony on a passive optical network (TPON), with a 128 way split and using time division multiplex (TDM) running at 20 Mb/s. This combination enabled basic rate integrated service digital network (ISDN) to be provided to all customers. In practice, the competitive cost constraint of the existing copper network precludes domestic customers from having just telephony over fibre, due to the high capital cost of equipment. This may change in the future. In the meantime, telephony for small business users (for example those having more than 5 lines) can probably break this barrier.

The wider range of services and higher capacity required by business customers makes a 32-way split more attractive for a 20 Mb/s system and this has been demonstrated by BT's local loop optical field trial (LLOFT) at Bishop's Stortford.

In summary, the use of splitter based PON architecture will reduce the cost of fibre deployment in the access network. When compared with point-to-point fibre, savings will result from:

(i) reducing the number of fibres at the exchange and in the network;

(ii) reducing the amount of terminal equipment at the exchange;

(iii) sharing the cost of equipment amongst a number of customers;

(iv) providing a thin, widespread, low cost, fibre infrastructure; and (v) providing a high degree of flexibility, and allowing 'just in-time' equipment and service provision.

Additionally, PON architecture can be tailored to suit the existing infrastructure resources (duct and other civil works).

Total network transparency will retain the option for future services to be provided on different wavelengths to the telecommunications, which for TPON is in the 1300 nm window. By transmitting at other wavelengths, other services, such as broadband access for cable television and high definition television, or business services, such as high bit rate data, video telephony or video conferencing, can be provided. The huge bandwidth potential of fibre promises virtually unlimited capacity for the transparent network. Eventually, it will be possible to transmit hundreds of wavelengths simultaneously, as the development of technology in optical components, such as narrow band lasers, wavelength division multiplexers (WDMs), optical filters, fibre amplifiers and tunable devices, moves forward.

For this potential to remain available, and for the access network to be used to provide many and varied services, then it must be designed and engineered to provide very high levels of security and resilience. Even for simple POTS, advance warning and live maintenance are essential to limit disruption.

Resilience implies separacy of routing, and exploiting the existing infrastructure of underground ducts and other civil works is a prime requirement of the design philosophy. Analysis of this resource has indicated that separacy, from creating primary ring topographies, could be achieved by linking the spine cables which currently feed many primary connection points (PCPs) in the existing star type network.

In order to create rings from the existing star configurations, some localities will have existing ducts that will allow the link cables to be installed. In BT's suburban networks, analysis has shown that on average 60% of PCPs can be served on rings using existing ducts; and, by adding new ducts links of 200 m or less, a further 30% can be covered. In some cases, there will be natural or man made boundaries where physical rings cannot be provided, and in these cases duplicate fibres in the same duct route, i.e. across rivers or over railway bridges, may be the only choice.

The architecture adopted for the PON topography will be influenced by transmission techniques, and the availability of suitable splitter components. Transmission options are simplex (two fibre paths), duplex, half duplex or diplex (single fibre path).

Simplex working increases the complexity of the infrastructure due to the two fibres per circuit required. However, it benefits from the lowest optical insertion loss, due to the absence of duplexing couplers; and the lowest return loss, since such systems are insensitive to reflections of less than 25 dBm with separate transmit and receive paths. Duplex and half duplex working each have an insertion loss penalty of 7 dB from the duplexing couplers, and diplex working replaces these with WDMs, with a reduced penalty of 2 dB.

In view of the long term aim to provide a total fibre infrastructure, and the present early state of passive technology components, it is considered beneficial to opt for simplex working and a relatively low level of split ($\leq 32$) for PON networks.

BRIEF SUMMARY OF THE INVENTION

The present invention provides an optical fibre management system comprising a plurality of splice trays arranged in a stack, each splice tray having a main body portion for holding at least one splice and for storing fibres leading to the or each splice, and a fibre entry/exit portion for feeding fibre to/from the main body portion, wherein each tray is mounted in the stack so as to be movable from a stacked position, in which it is aligned with the other trays, to first and second operating positions in which the fibre entry/exit portion and the main body portion respectively are accessible.

In a preferred embodiment, each of the splice trays is provided with a hinged mounting arm one end of which is fixed to the main body portion of the tray, and the other end of which carries a retaining ring, and wherein the system further comprises a retaining rod which passes through the retaining rings of the splice trays when the splice trays are in their stacked or first operating positions. Preferably, the mounting arm of each of the splice trays is such that the two parts of the arm on opposite sides of the hinge lie in close proximity to one another in a folded-back position against the main body portion of that tray when the tray is its stacked position, said two arm portions being in a generally straight line configuration when that tray is in its first operating position.

Advantageously, the fibre entry/exit portion of each splice tray is formed with at least one fibre test zone, and preferably each fibre test zone is constituted by an aperture formed in the associated fibre entry/exit portion, the arrangement being such that, in use, with a given splice tray in its first operating position, any fibre which overlies an aperture can be accessed by a test probe via said aperture.

The fibre entry/exit portion of each splice tray may be provided with at least two fibre entry/exit ports.

Preferably, the system further comprises a fibre break-out tray for separating the fibre end portions formed by cutting at least two fibres of a multi-fibre cable from the remaining fibres in the cable. In this case, the system may further comprise at least one fibre routing mechanism for guiding the fibre end portions from the break-out tray towards the stack of splice trays, the or each fibre routing mechanism being constructed so that it cannot be bent beyond the minimum bend radius requirements for live optical fibre. Conveniently, the break-out tray includes means for guiding the fibre end portions into the fibre routing mechanism, and means for storing a length of uncut cable. The break-out tray may also include means for storing lengths of fibre end portions.

Advantageously, first and second fibre routing mechanisms pass from the break-out tray to first and second of the splice trays, the first fibre routing mechanism carrying, in use, first fibre end portions from two cut fibres, and the second fibre routing mechanism carrying, in use, second fibre end portions from said two cut fibres. In this case, the system may further comprise first and second splitter mats, each splitter mat housing first and second input fibres spliced to a plurality of output fibres by splitter means. Preferably, said first input fibres are constituted by fibres which, in use, are spliced to said first fibre end portions in the first splice tray, and said second input fibres are constituted by fibres which, in use, are spliced to said second fibre end portions in the second splice tray. Conveniently, each output fibre of the first splitter mat is paired with a respective output fibre of the second splitter mat, the fibres of each pair being spliced, in use, to customer fibres in a respective one of the other splice trays in the stack. The fibres may be guided, in pairs, between the splitter mats and the associated splice trays in respective fibre routing mechanisms.

In a preferred embodiment, each splitter mat includes a pair of channels for housing its input fibres, respective output channels for housing its output fibres, and holder means for housing its splitter means. Advantageously, the input channels and the output channels of each splitter mat are positioned along one edge of that splitter mat, each splitter mat being formed with a curved guide for guiding its output fibres from its splitter means to its output channels in such a manner that said output fibres are not curved beyond minimum bend radius requirements for optical fibre.

Each of the splitter mats may be made of a flexible polymer, and the splitter mats may be positioned together against the edge of the stack of splice trays. Conveniently, the splitter mats are held in position against the edge of the stack of splice trays by a backing plate. Preferably, the backing plate is provided with a plurality of outwardly-projecting ribs, each of which is formed with a plurality of apertures which constitute a matrix of tie points for the attachment of cable ties which, in use, support the fibre routing mechanisms.

The invention also provides a splice tray having a main body portion for holding at least one splice and for storing fibres leading to the or each splice, and a fibre entry/exit portion for feeding fibre to/from the main body portion, wherein the fibre entry/exit portion of the splice tray is formed with at least one fibre test zone.

Advantageously, the or each fibre test zone is constituted by an aperture formed in the fibre entry/exit portion, the arrangement being such that, in use, any fibre which overlies an aperture can be accessed by a test probe via said aperture. Preferably, the fibre entry/exit ports, each of which is associated with a pair of respective apertures constituting fibre test zones. The fibre entry/exit portion may be provided with a third fibre entry/exit port.

In a preferred embodiment, the main body portion has a splice holder region, a live fibre storage region, and tracks leading from the fibre entry/exit portion so as to guide fibres to the splice holder region from each end thereof, at least one track being recessed into the live fibre storage region.

The splice tray may further comprise a hollow mandrel positioned at that end of the splice tray where fibre passes between the main body portion and the fibre entry/exit portion, the mandrel being shaped and sized to guide fibre therearound in such a manner that it cannot be bend beyond the minimum bend radius requirements for optical fibre. The mandrel may be provided with an inlet aperture through which dark fibre can access a further fibre storage area provided within the mandrel.

Advantageously, the live fibre storage area is formed adjacent to the mandrel, the arrangement being such that live fibre can be stored in said area by confining loops of optical fibre under their own nature resilience with the loops of fibre having radii of curvature exceeding the minimum bend radius curvature for live fibre, and the main body portion is provided with fibre retention tabs overlying the live fibre storage region.

The invention further provides a splitter mat wherein the splitter mat is generally of rectangular configuration with the input channels and the output channels positioned along one edge thereof, and wherein the mat is formed with a curved guide for guiding the output fibres from the splitter means to the output channels in such a manner that the output fibres are not curved beyond minimum bend radius requirements for live optical fibre.

The invention also provides a break-out tray for separating the fibre end portions formed by cutting one or more fibres of a multi-fibre cable from the remaining fibres in the cable, the breakout tray including means for guiding the fibre end portions to a fibre exit portion of the tray, and means for storing a length of uncut cable.

BRIEF DESCRIPTION OF THE DRAWINGS

The invention will now be described in greater detail, by way of example, with reference to the accompanying drawings, in which:

FIG. 3 is a perspective view showing the node of FIGS. 1 and 2 mounted in a footway box in a storage position;

FIG. 4 is a perspective view similar to that of FIG. 3, but showing the node 2 mounted in the footway box in its working position;

FIG. 9 is a perspective view of one of the bend-limiting tube manifolds of the splitter array sub-assembly of FIGS. 5 and 6;

FIG. 10 is a perspective view of one of the coupler array mats of the splitter array sub-assembly of FIGS. 5 and 6;

FIG. 11 is a perspective view of the coupler array back cover of the splitter array sub-assembly;

FIG. 12 is a plan view of the break-out tray which forms part of the node of FIGS. 1 and 2;

FIG. 13 is an enlarged perspective view of part of the break-out tray; and

FIG. 14 is a perspective view of another form of splice tray which can be incorporated into a splitter array sub-assembly.

DETAILED DESCRIPTION OF EXEMPLARY EMBODIMENTS

Figure 1:
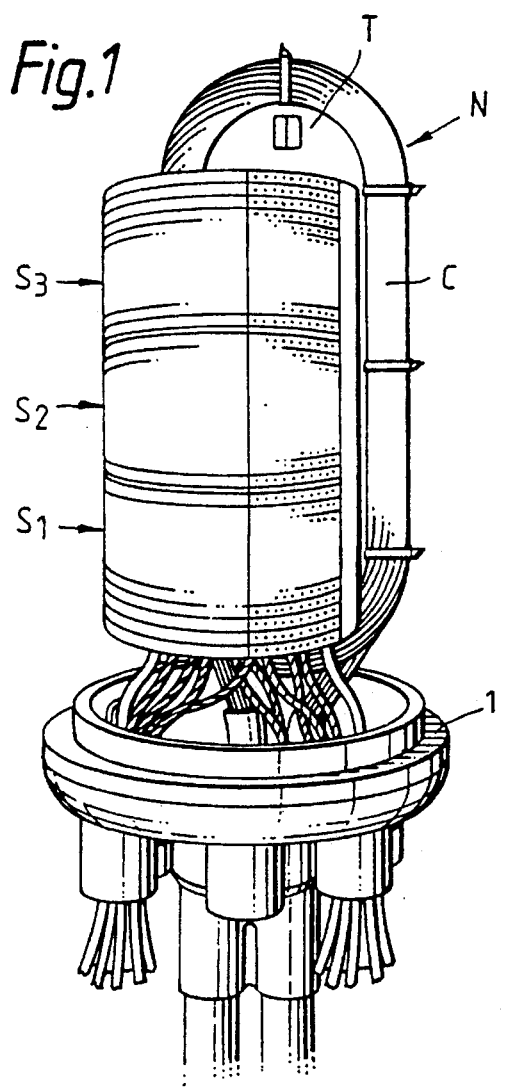
FIG. 1 is a perspective view, for one side, of an optical fibre telecommunications network node incorporating three splitter array sub-assemblies each of which is constructed in accordance with the invention.
Figure 2:
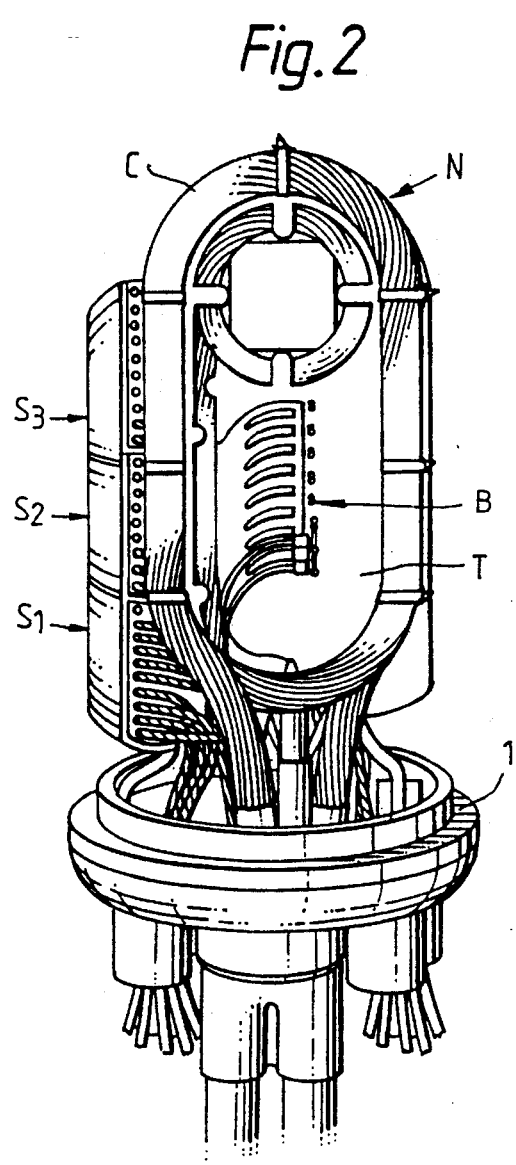
FIG. 2 is a perspective view, form the opposite side, of the node of FIG. 1.

Referring to the drawings, FIGS. 1 and 2 show a node N forming part of a ring topography PON. The node N includes a stack of three splitter array sub-assemblies $S_1$, $S_2$ and $S_3$ and a break-out tray T. A 96 fibre cable C, which forms a ring (loop) centred on a local exchange (not shown), enters the break-out tray T via a cable entry portion 2 (see FIG. 12) after passing through a node base 1. The cable (then passes at least twice round a generally oval perimeter track 3 of the tray T, and leaves the tray via the portion 2. The 96 fibres are housed in twelve flexible tubes (not shown) made of plastics material, each of the tubes containing eight primary-coated fibres. As is described in detail below with reference to FIG. 12, the tray T includes a break-out region B in which individual fibre end portions, formed by cutting into one of the tubes, are led to the splitter array sub-assemblies $S_1$, $S_2$ and $S_3$. In this connection, it should be noted that the tray T stores a sufficient length of the cable C so that, after cutting one of the tubes in the middle of this stored length, and stripping back that tube to expose its optical fibres, each of the originally continuous fibres forms two fibre end portions whose length is sufficient to be led to the splitter array sub-assemblies $S_1$, $S_2$ and $S_3$, and to leave spare fibre which can be stored for future use.

FIGS. 3 and 4 show the mounting of the node N in a footway box F, a dome-shaped cover D being fixed to the node base 1 prior to mounting.

Figure 5:
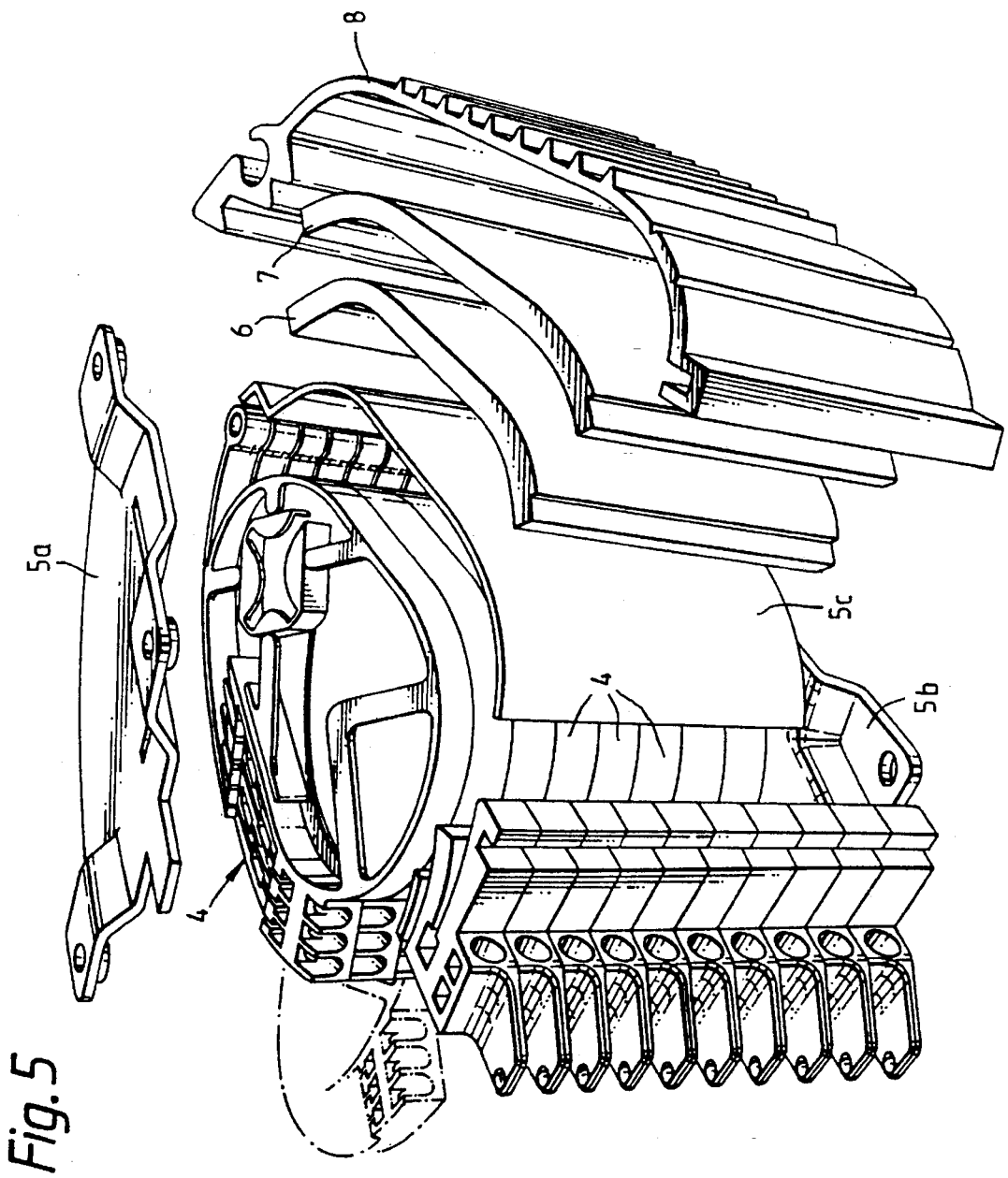
FIG. 5 is an exploded perspective view of one of the splitter array sub-assemblies of the node of FIGS. 1 and 2.
Figure 6:
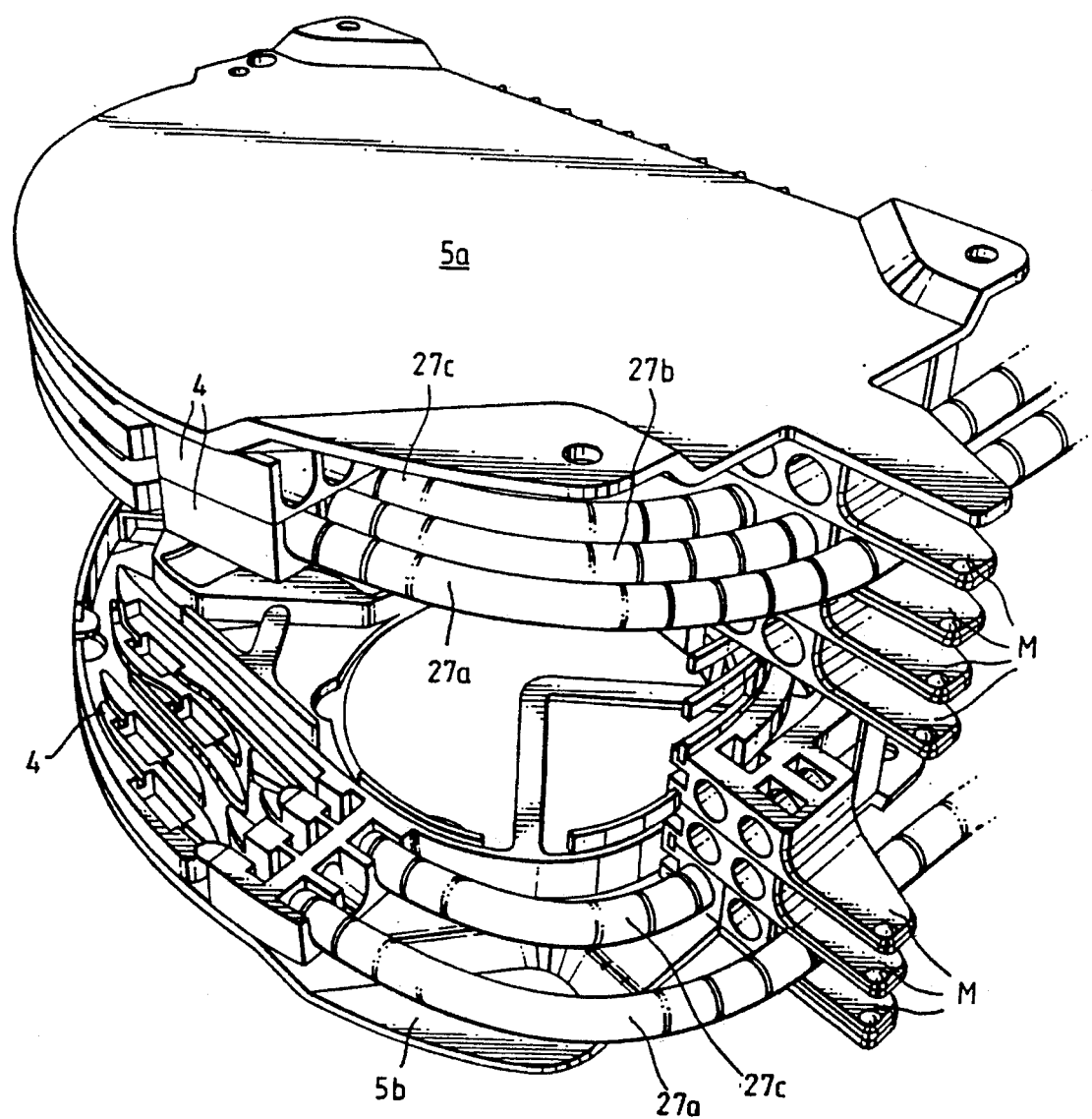
FIG. 6 is a perspective similar to that of FIG. 5, but showing parts of the sub-assembly, then parts being in their operative positions.

One of the splitter array sub-assemblies, $S_1$, is shown in detail in FIGS. 5 and 6. The other two sub-assemblies $S_2$ and $S_3$ are the same as the sub-assembly $S_1$. The sub-assembly $S_1$ includes a stack of ten splice trays 4, each of which is 8 mm thick. The trays 4 are supported (in a manner described below) by a stainless steel chassis 5 constituted by a top plate 5a, a base plate 5b and a back plate 5c. Each of the splice trays 4 is a single circuit splice tray, that is to say, in use, it has two incoming optical fibres (one each for transmitting and receiving), and two outgoing optical fibres (one each for transmitting and receiving). The three plates 5a, 5b and 5c are welded together, and the top plate 5a of the sub-assembly $S_1$ can be fixed to the base plate 5b of the adjacent sub-assembly $S_2$ (not shown in FIGS. 5 and 6) by means of mounting bolts (not shown). Similar mounting bolts can be used to fix the plate 5a of the subassembly $S_1$ and the plate 5b of the sub-assembly $S_3$ to support means (not shown) in the node N.

The chassis 5 also supports an input splitter array mat 6, an output splitter array mat 7, and a splitter array back cover 8. In this connection, the input mat 6 carries (as is described below with reference to FIG. 10) fibres which carry telecommunications signals from the exchange to customers. These fibres are termed transmit fibres. Similarly, the output mat 7 carries fibres which carry telecommunications signals from customers to the exchange. These fibres are termed receive fibres. The mats 6 and 7 are made of a flexible polymer, for example an elastomeric polymer such as injection mouldable zantoprene, or polyurethane. The back cover 8 is made of flexible polypropylene (which is also injection mouldable). This inherent flexibility ensures that, in use, the mats 6 and 7 are held firmly against the chassis back plate 5c by the back cover 8.

Figure 7:
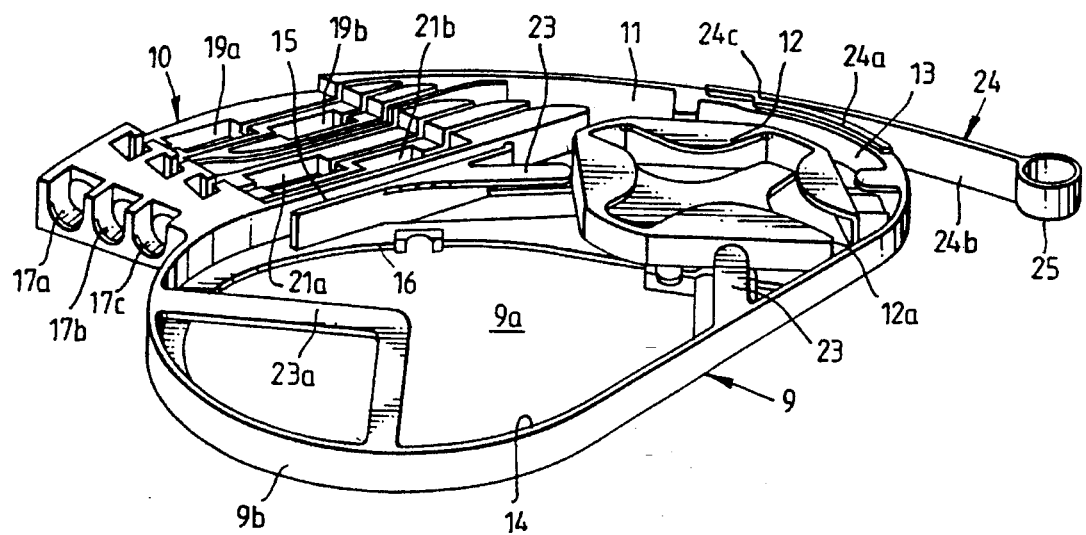
FIG. 7 is a perspective view of one of the splice trays of the splitter array sub-assembly of FIGS. 5 and 6.

As shown in FIG. 7, each splice tray 4 has a main body portion 9 and a fibre entry portion 10 which also constitutes a clip-on test area. Fibre access to the main body portion 9 from the fibre entry portion 10 is via a channel 11. The main body portion 9 is of oval configuration, having an oval base 9a and an upstanding peripheral wall 9b. A hollow mandrel 12 is provided on the base 9a adjacent to the entry channel 11. The mandrel 12 is of rounded square cross-section, is sized to ensure minimum bend requirements for live fibre passing around it, and has a fibre inlet aperture 12a through which dark fibre can pass for internal storage. A channel 13 is defined between the mandrel 12 and the peripheral wall 9b, the channel 13 leading to a further channel 14 which leads around the inside of the wall to a splice holder region 15. In use, this region 15 houses a splice holder (not shown) for splicing two incoming fibres to two outgoing fibres. A direction reversing channel 16 leads from the channel 14 adjacent to the region 15 back to that portion of the channel 14 which adjoins the channel 13 adjacent to the mandrel 12.

Figure 8:
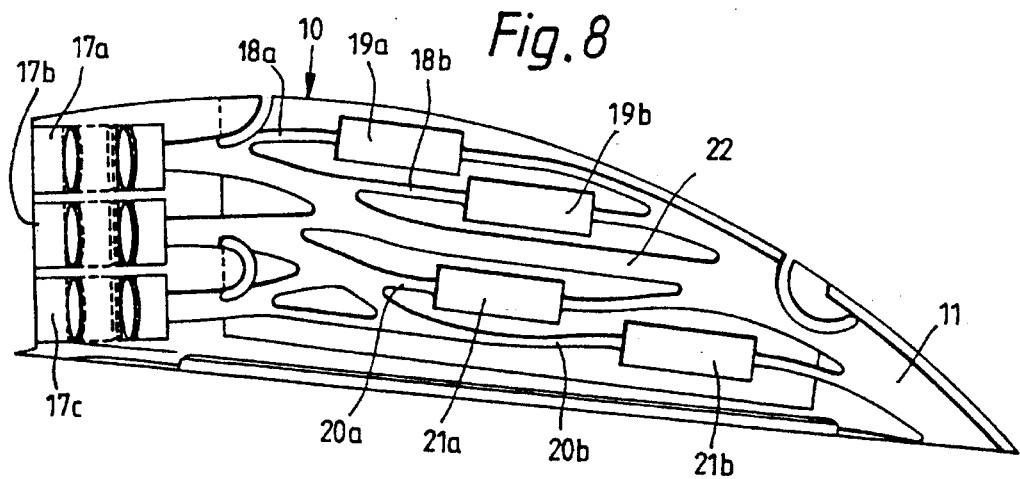
FIG. 8 is a plan view showing the fibre entry/exit portion of the splice tray of FIG. 7.

The fibre entry portion 10 of each splice tray 4 includes three fibre entry/exit ports 17a, 17b and 17c (see FIG. 8). Diverging channels 18a and 18b are provided to lead fibre between the port 17a and the channel 11 via respective apertures 19a and 19b. These apertures 19a and 19b constitute what are known as "clip-on apertures", and provide easy access to the associated fibres in order to measure the light passing there along, and hence to determine the quality of the splices. These clip-on apertures, and associated light measurement apparatus, are described in the specification of our International patent application WO 93/00600.

Similar diverging channels 20a and 20b are provided to lead fibre between the port 17c and the channel 11 via respective clip-on apertures 21a and 21b. A single channel 22 is provided for leading fibre between the port 17b and the channel 11. The channel 22 is not provided with a clip-on aperture.

Each splice tray 4 is also provided with a number of fibre retention tabs 23 for holding fibre in the various channels 11, 13, 14, 16, 18a, 18b, 20a, 20b and 22. One of these tabs (indicated by the reference numeral 23a) is generally V-shaped, and extends from the curved end of the peripheral wall 9b remote from the mandrel 12 about halfway across, and above, that portion of the base 9a between that wall portion and the mandrel.

Each tray 4 is pivotally mounted on the splitter array back cover 8 by means of a leash 24 and a retaining ring 25 which are moulded integrally with the rest of the tray. The leash 24 of each tray 4 has two arms 24a and 24b joined together by a hinge 24c. Its retaining ring 25 is a friction fit within a groove 26 formed in the back cover 8 (see FIG. 11). In use, a rod (not shown) passes through all the retaining rings 25 and through apertures (not shown) in the top and base plates 5a and 5b. In this way all the splice trays 4 are retained by their back plates 5c, but each can be pivoted out away from the other trays in the stack to provide access to its clip-on apertures 19a, 19b, 21a and 21b. In this position, the arms 24a and 24b take up a generally straightline configuration (as opposed to the V-shaped configuration they have when the tray is in the stack). As the retaining ring 25 of a pivoted-out tray 4 is held in position by the retaining rod, the pivotal movement of the tray is limited by the leash 24 as its two arms 24a and 24b straighten out. In the fully pivoted-out position, the fibre entry portion 10 of a tray 4 is exposed.

Each of the splitter array sub-assemblies $S_1$, $S_2$ and $S_3$ is associated with two fibres (four fibre end portions) of the eight fibres in the cut tube of the cable. The remaining two fibres (four fibre end portions) from the cut tube are stored in the break-out tray T as is described below with reference to FIG. 13. As the cable C is in the form of a ring, telecommunications signals can travel to/from the exchange in either direction round the ring. For convenience, one of the directions is termed the main direction, and the other the standby direction. In practice, only main fibres will be used for normal signalling, the standby fibres only being used in the eventuality of main fibre failure.

The two main fibre end portions associated with say the splitter array sub-assembly $S_1$ pass from the break-out tray T to the lowest splice tray 4 of that assembly, the fibre end portions being supported in, and protected by, a bend limiting tube 27a (see FIG. 6). This bend limiting tube 27a is a proprietary item made of polypropylene ringed tubing which, though flexible, cannot easily be bent beyond minimum bend radius requirements for live fibre. The bend limiting tube 27a terminates in the port 17a of the lowest splice tray 4, and its two fibre end portions are led into the main body portion 9 via the channels 18a and 18b, the clip-on apertures 19a and 19b, and the channel 11. These fibre end portions are then spliced to the ends of a pair of fibres which (as is described below) are associated with the mats 6 and 7. The two splices are then positioned in a splice holder which is then mounted in the region 15. The four fibres leading to the splices are then stored in the main body portion 9 of the tray 4 with two of the fibres (for example those from the break-out tray T) being led away from the splices in the channel 14, and the other two fibres being led away from the splices via the channel 13 and the reversing channel 16. A length of each of the fibres is stored in the main body portion 9 of the tray 4 by passing these fibres one or more times round the mandrel 12 and under the V-shaped tab 23a. The fibres' natural resilience will ensure that the loops of fibre expand outwardly into a configuration of varying diameter turns. The provision of stored fibre permits a minimum of ten re-splices of each of the splices to be carried out during the lifetime of the assembly.

The two fibres which are associated with the mats 6 and 7 leave the main body portion of the tray 4 via the channel 11. They are then led to the port 17c of the entry portion 10 via the clip-on windows 21a and 21b and the channels 20a and 20b. These fibres are then led to the mats 6 and 7 within a bend limiting tube 27c (see FIG. 6). One of these main input fibres terminates on the input mat 6, where (as is described below with reference to FIG. 10) it is joined by splitter means to eight output fibres. Similarly, the other of these main input fibres terminates on the output mat 7, where it is joined by splitter means to eight output fibres.

The two standby fibre end portions associated with this splitter array sub-assembly $S_1$ pass from the break out tray T to the second lowest splice tray 4 of that assembly. Here, these two fibre end portions are spliced to two fibres which are led back to the mats 6 and 7 and so are termed standby input fibres, and each of the standby input fibres is joined by splitter means to the same eight output fibres as the corresponding main input fibre. The fibre arrangement on this second lowest splice tray 4 is the same as that for the lowest splice tray. Similarly, fibres enter and leave this splice tray 4 in bend limiting tubes 27a and 27c.

The remaining eight splice trays 4 in the sub-assembly $S_1$ of FIGS. 5 and 6 are customer splice trays. As the fibre arrangement in each of these customer splice trays 4 is the same, this will be described in detail for only one of these trays. Thus, one of the output fibres from each of the mats 6 and 7 (that is to say a transmit fibre and a receive fibre) is led to the port 17c of a given customer splice tray 4 inside a bend limiting tube 27c. These two fibres are led into the main body portion 9 of the tray 4 via the channels 20a and 20b, the clip-on windows 21a and 21b, and the channel 11. In use, these fibres are spliced to two fibres of a four-fibre blown fibre unit associated with a given customer. Such a unit has four fibres in a single tube, the tube being fed between the customer and the node N by the well known fibre blowing technique (see EP 108590). The customer's blown fibre unit is led to the port 17a of the splice tray 4 within a bend limiting tube 27a. The blown fibre coatings are stripped away from the four fibres "downstream" of the port 17a.

Two of the fibres within the unit (the two fibres which are to be spliced to the transmit and receive fibres from the mats 6 and 7, and so are termed live fibres) are fed to the main body portion 9 of the splice tray 4 via the channels 18a and 18b, the clip-on apertures 19a and 19b, and the channel 11. The two other fibres (which are spare fibres not for immediate use) are fed to the main body portion 9 of the splice tray 4 via the channels 22 and 11. All four fibres then pass round the mandrel 12 within the channel 13, and then back to the mandrel after passing along the channels 14 and 16. The two spare (dark) customer fibres pass through the aperture 12a and are stored inside the mandrel 12. The two live fibres pass round the mandrel 12, and are then spliced to the transmit and receive fibres from the mats 6 and 7, the splices are stored in a splice holder, and the splice holder is positioned in the region 15. As with the two lowest splice trays 4, each of the spliced fibres has a length to be stored (enabling up to ten re-splices to be made during the lifetime of the assembly), these fibre lengths likewise being stored by looping them each one or more times round the mandrel 12 and under the V-shaped tab 23a.

In order to access the splices within a given splice tray 4, it is necessary to remove the rod holding the retaining rings 25 in position, prior to the pulling that tray out of the stack sufficiently far to gain access to the splices. In this position, the tray 4 is maintained in position by its bend limiting tubes.

The two spare customer fibres stored within the mandrel 12 of a given splice tray 4 can be used to replace the two live fibres of that customer in the event of these fibres failing. More importantly, however, they can be used to provide that customer with additional lines or service. (In this connection, it should be noted that each fibre pair can provide up to 32 lines using customer premises equipment (CPE) electronics such as an optical network unit (ONU) matched to an optical line terminal (OLT) at the exchange. Each pair of fibres can also provide a Megastream service.) In this case, the two spare fibres are removed from their storage position within the mandrel 12, and are led to the fibre entry portion 10 of the tray 4 via the channels 13 and 11. They then leave the tray 4, via the apertureless channel 22 and the port 17b, and enter a bend limiting tube 27b (see FIG. 6). This tube 27b is routed via the back cover plate 8 to another splice tray 4—usually a splice tray of another of the sub-assemblies $S_2$ or $S_3$ of the node N. The tube 27b terminates at the port 17a of this tray 4, and the two fibres are led into the main body portion 9 via the channels 18a and 18b, the apertures 19a and 19b, and the channel 11. Here they are spliced to two "exchange" fibres, and all spare lengths of fibre are stored in the same manner as that described above for the other splice trays. In this connection, the "exchange" fibres could be either a second pair of fibres from the break-out tray T (direct exchange fibres), or a pair of output fibres from the mats 6 and 7 (indirect exchange fibres).

The bend limiting tubes 27a, 27b and 27c of each of the splice trays 4 are provided with respective support manifolds M (see FIGS. 6 and 9). Each manifold M is a sliding friction fit on a flanged portion (not shown) of the chassis back plate 5c, and is provided with an open aperture 28a for supporting the associated bend limiting tube 27a, and with a pair of closed apertures 28b and 28c for supporting respectively the associated bend limiting tube 27b (if there is one) and the associated bend limiting tube 27c. The manifolds M are made of injection moulded filled nylon.

FIG. 10 shows the input mat 6 of the sub-assembly $S_1$. The output mat 7 of this sub-assembly, being of identical construction to the input mat 6, will not be described in detail. The mat 6 includes an input slot 29 for receiving the main input fibre, and an input slot 30 for receiving the standby input fibre. These two slots 29 and 30 lead to an aperture 31 which houses a 2×2 fused coupler (not shown). The two output fibres from this fused coupler are led via a curved channel 32 around a mandrel 33. The mandrel 33 has a radius of 30 mm, and so fulfils the minimum bend requirements for live fibre. Each of the fused coupler output fibres is spliced to an input fibre to a respective 1×4 planar coupler (splitter). The two splices are stored in a recess 35b.

The two planar couplers (not shown) are housed in an aperture 34 adjacent to the aperture 31. The two fibres pass from the mandrel 33 to their planar couplers via the curved end wall 35a of a recessed portion 35 of the mat 6, and via respective curved slot 36. The eight output fibres of the two planar couplers pass round the mandrel 33 via a slot 37. These fibres then leave the mat 6 via respective output slots 38 which fan out over the recessed portion 35 and the adjacent raised portion which defines the curved end wall 35a.

The mat 6 thus forms a 2×8 splitter for the transmit fibres, with one of its inputs being the main transmit input fibre and the other the standby transmit input fibre. As mentioned above, only main fibres are used in normal operation, so the mat 6 acts as a 1×8 splitter. However, should there be problems with the main fibre route, the mat 6 will still act as a 1×8 splitter with the standby receive fibre as its input fibre.

Similarly, the mat 7 constitutes a 2×8 splitter for the receive fibres.

FIG. 11 shows the splitter array back cover 8 of the sub-assembly $S_1$ in greater detail. The back cover 8 is formed with a pair of longitudinally-extending grooves 8a adjacent to that end remote from the groove 26. These grooves 8a reduce the thickness of the back cover in this end region, and so enhance the flexibility of the back cover, thereby ensuring that, in use, the back cover holds the mats 6 and 7 firmly against the chassis back plate 5c. In this connection, it should be noted that this end region of the back cover 8 is formed with an in-turned L - shaped flange 8b which can be snapped over grooves 28d formed in the manifolds M to hold the back cover to the chassis 5 with the mats 6 and 7 firmly sandwiched therebetween.

The outer surface of the back cover 8 is also provided with a plurality of longitudinally-extending ribs 8c, the base of each rib being formed with a plurality of apertures 8d. These apertures 8d extend right through the back cover 8 to its inside surface, and constitute a matrix of tie points for the attachment of cable ties which are used to tie the bend limiting tubes 27a, 27b and 27c to the sub-assembly S.

FIG. 12 shows the break-out tray T in greater detail. As mentioned above, two loops of the cable are stored in the track 3, before the cable exits the break-out tray T via the entry portion 2, and one of the tubes of the cable is cut in the middle of its stored length. One of the cut fibres forms the main fibre for the splitter array sub-assembly shown in FIGS. 5 and 6, and another the standby fibre for that sub-assembly. The remaining fibres can be main and standby fibres for other splitter array sub-assemblies $S_2$ and $S_3$ of the node N, or can be stored around a mandrel 39 at that end of the tray T remote from the cable entry portion 2. The mandrel 39 has a rounded rectangular cross-section, and is sized so that fibre coiled therearound does not exceed minimum bend radius requirements.

The break-out region B of the tray T is formed with a plurality of curved upstanding fingers 40, adjacent pairs of which define sixteen fibre feed channels 41. The two fibre end portions that constitute the main fibres associated with the lowest splice tray 4 of the sub-assembly $S_1$, are fed through the first channel 41 (that is to say through the channel nearest the entry portion 2). Similarly, the two fibre end portions that constitute the standby fibres associated with the second lowest splice tray 4 are fed through the second channel 41. (As there are sixteen channels 41, the break-out tray T can handle sixteen pairs of fibre end portions, that is to say all the fibre end portions from two cut tubes.) The two fibres then pass into the bend limiting tube 27a associated with the lowest splice tray 4 of the sub-assembly $S_1$. This tube 27a passes through an aperture 42 in a raised portion 43 of the break-out region B (see FIG. 13), and is tied in place by ties (not shown) associated with a further aperture 44.

A preferred form of TPON includes a 32-way split, that is to say each fibre from the exchange serves 32 actual customers via one or more splitting (flexibility) points such as the node N described above. As the node N defines an 8-way split, it could be used as a primary splitting point, in which case each of the "customer" fibres leaving the node would lead to a respective secondary splitting point. Each of the secondary splitting points would be similar to the node N, but each incoming fibre would be split four ways rather than eight ways. As the outgoing fibres from a primary node do not go directly to customers, the terms "customer splice trays" and "customer fibres" used above should be taken to mean splice trays and fibres associated with either actual customers or with downstream splitting points. Of course, in the preferred 32-way split form of TPON, the nodes N could also be secondary nodes. In this case, there would be four nodes N, each serving eight actual customers, and the four secondary nodes would be served via a 4-way split primary node. Here again, the primary node, would be similar to the node N, but each incoming (exchange) fibre would be split four ways rather than eight ways.

It will be apparent that the type of splitter array sub-assembly described above is extremely flexible in that it can readily be adapted to suit different requirements. In particular, it is adaptable to any splitting ratio by varying the number of splice trays used and the size and form of the splitter array mats 6 and 7. Moreover, by co-locating several splitter array sub-assemblies in a node, splitting from a plurality of exchange fibres can be accomplished at any given point, using different splitting ratios in each sub-assembly if required.

An important advantage of the sub-assemblies described above, is that the splitters and the associated fibres can all be factory fitted. Thus, the fused and planar couplers and their associated fibres can be made and positioned in the mats 6 and 7, and the associated fibres can be led to their splice trays 4 within bend limiting tubes—all at the factory. When the sub-assembly is to be commissioned, the fitter needs only to cut one or more tubes of the cable C, feed main and standby fibre end portions to the lowest two splice trays 4 of the sub-assembly, store spare cut fibre end portions in the break-out tray T, splice the main and standby fibre end portions to the main and standby input fibres already present in the two splice trays, and to splice "customer" fibres to the fibres already present in the other splice trays 4. In this way, the amount of skilled work which has to be carried out on site is reduced to a minimum. In particular, the fitter does not need to carry out any intricate splicing for splitting purposes.

The sub-assembly described above could also be adapted for use in a spur joint. In such a case, no splitting is required, so the sub-assembly would not include the mats 6 and 7. In a first type of spur joint, all twelve tubes of the fibre cable C would be cut, thereby forming twelve main fibre tube ends and twelve standby fibre tube ends. The fibres of six of the main fibre tube ends would then be spliced to the fibres of six of the standby fibre tube ends in special (single element) splice trays 45 (as is described below with reference to FIG. 14). The fibres of the remaining six main fibre tube ends are then spliced to "customer" fibres in 24 splice trays 4. Similarly, the fibres of the remaining six standby fibre tube ends are spliced to 48 "customer" fibres in 24 splice trays 4. Thus, two fibres are fed, in bend limiting tubes, from a breakout tray (not shown) to each of the 48 splice trays 4, where they are spliced to "customer" fibres in a similar manner to that described above with reference to FIGS. 5 and 6.

A respective main fibre tube end and a respective standby fibre tube end are fed from the break-out tray to each of the splice trays 45 (see FIG. 14), each tube end being in a respective bend limiting tube (not shown, but similar to the bend limiting tubes 27a, 27b and 27c). Each tray 45 has a main body portion 46 and a tube entry portion 47. The main body portion 46 is of oval configuration, having an oval base 46a and an upstanding peripheral wall 46b. Fibre access to the main body portion 46 from the tube entry portion 47 is via a channel 48. Channels 49, 50, 51 and 52 are provided in the main body portion 46 to guide both main and standby fibres to a pair of splice holder regions 53. The channel 51 is a direction reversing channel, and permits main and standby fibres to approach each of the splice holder regions 53 from opposite directions.

Each splice tray 45 is also provided with a number of fibre retention tabs 54 for holding fibre in the various channels 49 to 52.

The tube entry portion 47 of each splice tray 45 includes two tube entry/exit ports 55a and 55b. Channels 56a and 56b are provided to lead fibre between the ports 55a and 55b and the channel 48.

The splice tray is provided with a leash 57 and a retaining ring 58 (similar to the leash 24 and the retaining ring 25 of the tray 4). The leash 57 permits the tray 45 to be pivoted out of a stack of trays to enable access to the tube entry portion 47.

In use, a main fibre tube end is led to the port 55a of each of the splice trays 45, and a standby fibre tube end is led to the port 55b of each of the splice trays 45. Inside each tube entry portion 47, the tubes are cut away to expose the fibres. The fibres are then fed into the main body portions 46 of the trays, where they are spliced. The eight splices in each tray 45 are then positioned, four in each of a pair of splice holders, and the splice holders are then mounted in the regions 53. The fibres leading to the splices are then stored in the main body portions 46 of the trays 45. A length of each of the fibres is stored in the main body portion 46 of the associated tray 45 by passing these fibres one or more times round an upstanding mandrel 59 and under the tabs 54. The fibres' natural resilience will ensure that the loops of fibre expand outwardly to a configuration of varying diameter turns. The provision of stored fibre permits re-splicing to be carried out during the lifetime of the assembly.

In a modified version of the spur joint described above, only six of the tubes are cut, the fibres in these tubes being spliced to "customer" fibres in 48 splice trays 4 as described above. The remaining six uncut tubes are looped around a break-out tray. Alternatively, instead of using 48 splice trays 4, six splice trays 45 could be used. This alternative would, however, only be used in cases where there is no need to access spur joints for future use.

Obviously, for either type of spur joint, the number of fibres forming the spur can be varied. For example, the spur could be formed from the fibres of one cut tube. In this case the spur would contain 16 fibres (eight main fibres and eight standby fibres from a single cut tube) and 88 fibres (from the remaining eleven tubes—either cut and spliced or uncut and coiled) would continue through on the ring.

We claim:

1. An optical fibre management system comprising:
   a plurality of generally planar splice trays arranged in a stack,
   each splice tray having a main body portion for holding at least one splice and for storing fibres leading to each splice,
   a fibre entry/exit portion for feeding fibre to/from the main body portion, and
   each tray being mounted in the stack so as to be movable, in its own plane, from a stacked position, in which it is aligned with the other trays, to first and second operating positions wherein only the fibre entry/exit portion is accessible in the first operating position and the main body portion and the fibre entry/exit portion are accessible in the second operating position.

2. A system as in claim 1, wherein:
   each of the splice trays includes a hinged mounting arm, one end of which is fixed to the main body portion of the tray, and the other end of which carries a retaining ring, and
   the system further including a retaining rod which passes through the retaining rings of the splice trays when the splice trays are in the stacked or first operating positions.

3. A system as in claim 2, wherein:
   the mounting arm of each of the splice trays has two parts which are each on opposite sides of a hinge and which both lie in close proximity to one another in a folded-back position against the main body portion of that tray when the tray is in its stacked position,
   said two arm parts being in a generally straight line configuration with each other when that tray is in its first operating position.

4. A system as in claim 1, wherein the fibre entry/exit portion of each splice tray is formed with at least one fibre test zone.

5. A system as in claim 4, wherein each fibre test zone includes an aperture formed in the associated fibre entry/exit portion, the arrangement being such that, in use, with a given splice tray in its first operating position, any fibre which overlies an aperture can be accessed by a test probe via said aperture.

6. A system as in claim 1, wherein the fibre entry/exit portion of each splice tray is provided with at least two fibre entry/exit ports.

7. A system as in claim 1, further comprising a fibre break-out tray for separating fibre end portions formed by cutting at least two fibres of a multi-fibre cable from remaining fibres in the cable.

8. A system as in claim 7, further comprising:
   at least one fibre routing mechanism for guiding the fibre end portions from the break-out tray towards the stack of splice trays,
   each fibre routing mechanism being constructed so that it cannot be bent beyond the minimum bend radius requirements for live optical fibre.

9. A system as in claim 8, wherein the break-out tray includes:
   means for guiding fibre end portions into the fibre routing mechanism(s), and
   means for storing a length of uncut cable.

10. A system as in claim 9, wherein the break-out tray also includes means for storing lengths of fibre end portions.

11. A system as in claim 9 wherein:
    first and second fibre routing mechanisms pass from the break-out tray to first and second of the splice trays,
    the first fibre routing mechanism carrying, in use, first fibre end portions from two cut fibres, and
    the second fibre routing mechanisms carrying, in use, second fibre end portions from said two cut fibres.

12. A system as in claim 11, further comprising:
    first and second splitter mats,
    each splitter mat housing first and second input fibres spliced to a plurality of output fibres by splitter means.

13. A system as in claim 12, wherein:
    said first input fibres are constituted by fibres which, in use, are spliced to said first fibre end portions in the first splice tray, and
    said second input fibres are constituted by fibres which, in use, are spliced to said second fibre end portions in the second splice tray.

14. A system as in claim 13, wherein fibres are guided, in pairs, between the splitter mats and the associated splice trays in respective fibre routing mechanisms.

15. A system as in claim 12, wherein each output fibre of the first splitter mat is paired with a respective output fibre of the second splitter mat, the fibres of each pair being spliced, in use, to customer fibres in a respective one of the other splice trays in the stack.

16. A system as in claim 12, wherein each splitter mat includes:
    a pair of channels for housing its input fibres,
    respective output channels for housing its output fibres, and
    holder means for housing its splitter means.

17. A system as in claim 16, wherein:
    the input channels and the output channels of each splitter mat are positioned along one edge of that splitter mat,
    each splitter mat being formed with a curved guide for guiding its output fibres from its splitter means to its output channels in such a manner that said output fibres are not curved beyond minimum bend radius requirements for live optical fibre.

18. A system as in claim 12, wherein each of the splitter mats is made of a flexible polymer.

19. A system as in claim 18, wherein the splitter mats are positioned together against the edge of the stack of splice trays.

20. A system as in claim 19, wherein the splitter mats are held in position against the edge of the stack of splice trays by a backing plate.

21. A system as in claim 20, wherein the backing plate is provided with means for supporting the fibre routing mechanisms.

22. A system as in claim 21, wherein the backing plate is provided with a plurality of outwardly-projecting ribs, each of which is formed with a plurality of apertures which constitute a matrix of tie points for the attachment of cable ties which, in use, support the fibre routing mechanisms.

23. An optical fibre splice tray having:
   a main body portion for holding at least one splice and for storing fibres leading to each splice, and
   a fibre entry/exit portion for feeding fibre to/from the main body portion,
   the fibre entry/exit portion of the splice tray being formed with at least one fibre test zone, and
   wherein each fibre test zone includes an aperture formed in the fibre entry/exit portion,
   the arrangement being such that, in use, any fibre which overlies an aperture can be accessed by a test probe via said aperture.

24. A splice tray as in claim 23, wherein the fibre entry/exit portion is provided with two fibre entry/exit ports, each of which is associated with a pair of respective apertures constituting fibre test zones.

25. A splice tray as in claim 24, wherein the fibre entry/exit portion is provided with a third fibre entry/exit port.

26. A splice tray as in claim 23, wherein the main body portion has:
   a splice holder region,
   a live fibre storage region, and
   tracks leading from the fibre entry/exit portion so as to guide fibres to each end of the splice holder region.

27. A splice tray as in claim 26, wherein at least one track is recessed into the live fibre storage region.

28. An optical fibre splice tray having:
   a main body portion for holding at least one splice and for storing fibres leading to each splice, and
   a fibre entry/exit portion for feeding fibre to/from the main body portion, the fibre entry/exit portion of the splice tray being formed with at least one fibre test zone wherein the main body portion has:
   a splice holder region,
   a live fibre storage region, and
   tracks leading from the fibre entry/exit portion so as to guide fibres to each end of the splice holder region, and
   a hollow mandrel positioned at an end of the splice tray where fibre passes between the main body portion and the fibre entry/exit portion,
   the mandrel being shaped and sized to guide fibre therearound in such a manner that it cannot be bent beyond the minimum bend radius requirements for live optical fibre.

29. A splice tray as in claim 28, wherein the mandrel is provided with an inlet aperture through which dark fibre can access a further fibre storage area provided within the mandrel.

30. A splice tray as in claim 28, wherein:
   the live fibre storage area is formed adjacent to the mandrel,
   the arrangement being such that live fibre can be stored in said area by confining loops of optical fibre under its own natural resilience with loops of fibre having radii of curvature exceeding the minimum bend radius curvature for live fibre.

31. A splice tray as in claim 30, wherein the main body portion is provided with fibre retention tabs overlying the live fibre storage region.

32. An optical fibre splitter mat formed with;
   a pair of channels for housing respective input optical fibres,
   a plurality of channels for housing respective output optical fibres,
   holder means for housing splitter means which splice input fibres to a plurality of output fibres, and wherein;
   the splitter mat is generally of rectangular configuration with the input channels and the output channels positioned along one edge thereof, and
   the splitter mat is formed with a curved guide for guiding the output fibres from the splitter means to the output channels in such a manner that the output fibres are not curved beyond minimum bend radius requirements for live optical fibre.

33. An optical fibre break-out tray for separating fibre end portions formed by cutting one or more fibres of a multi-fibre cable from remaining fibres in the cable, the breakout tray including:
   means for guiding fibre end portions to a fibre exit portion of the tray, and
   means for storing a length of uncut cable,
   the guide means including a plurality of curved guide fingers, adjacent pairs of which define channels for guiding fibre end portions to the fibre exit portion of the tray.

34. An optical fibre routing member including:
   a plurality of input channels for housing respective input optical fibres,
   a plurality of output channels for housing respective output optical fibres,
   the input channels being positioned along a first edge portion of the routing member,
   the output channels being positioned along a second edge portion of the routing member, and
   the routing member including a curved guide for guiding the output fibres from the input channels to the output channels in such a manner that the fibres are not curved beyond minimum bend radius requirements for live optical fibre.

35. A routing member as in claim 34 wherein a common edge of the routing member constitutes the first and second edge portions.

36. A routing member as in claim 34 further comprising:
   holder means for housing splitter means which splice input fibres to output fibres,
   the curved guide means being positioned to guide output fibres from the splitter means to output channels.

37. An optical fibre management system comprising:
   a plurality of generally planar optical fibre handling trays arranged in a stack, with each tray being mounted for independent individual movement out of the stack within its own plane,
   wherein each optical fibre handling tray includes a two-part arm hinged between its two ends, one of said ends being connected to its respective tray and the other of said ends being connected to a mounting bracket common to said stack of trays,
   wherein each optical fibre handling tray includes at least one splice testing zone located near a fibre entrance/exit port, and wherein said at least one splice testing zone includes an aperture in the tray over which an incoming/outgoing optical fibre is located by fibre guiding channels leading to and from the aperture.

38. An optical fibre management system comprising:

a plurality of generally planar optical fibre handling trays arranged in a stack, with each tray being mounted for independent individual movement out of the stack within its own plane, wherein each optical fibre handling tray includes a two-part arm hinged between its two ends, one of said ends being connected to its respective tray and the other of said ends being connected to a mounting bracket common to said stack of trays, wherein each optical fibre handling tray includes at least one splice testing zone located near a fibre entrance/exit port, and wherein said trays are each mounted for controlled movement to a first operating position partially out of the stack exposing said testing zone but not exposing any optical fibre splice or splitter.

* * * * *